United States Patent
Williamson et al.

(10) Patent No.: US 6,216,863 B1
(45) Date of Patent: Apr. 17, 2001

(54) DOUBLE-WALLED CONTAINER FOR COMPACT DISC

(76) Inventors: Randy Hy Williamson, 12900 Lake Ave., Apt. #1016, Lakewood, OH (US) 44107; Sean Patrick Manion, 607 Treeside La., Avon Lake, OH (US) 44012

(*) Notice: Subject to any disclaimer, the term of this patent is extended or adjusted under 35 U.S.C. 154(b) by 0 days.

(21) Appl. No.: 09/578,652

(22) Filed: May 25, 2000

(51) Int. Cl.⁷ .................................................. B65D 85/57
(52) U.S. Cl. .................... 206/308.1; 206/232; 206/313
(58) Field of Search .................... 206/307, 308.1, 206/311–313, 493, 1.5, 232; 220/324, 326, 345.3; 229/125.015, 125.125; 312/9.16, 9.26, 9.47, 9.48

(56) References Cited

U.S. PATENT DOCUMENTS

| | | | |
|---|---|---|---|
| 3,888,350 | * 6/1975 | Horvath | 220/345.3 |
| 4,453,631 | * 6/1984 | Mark | 206/313 |
| 5,080,222 | * 1/1992 | McNary | 206/1.5 |
| 5,522,500 | * 6/1996 | Mori | 206/308.1 |
| 5,655,656 | 8/1997 | Gottlieb | 206/308.1 |
| 5,682,990 | * 11/1997 | Schluger | 206/308.1 |
| 5,775,491 | * 7/1998 | Taniyama | 206/313 |
| 6,032,795 | * 3/2000 | Ehrlund et al. | 206/312 |

* cited by examiner

Primary Examiner—Luan K. Bui
(74) Attorney, Agent, or Firm—Alfred D. Lobo

(57) ABSTRACT

A container with double-walled construction eliminates problems encountered with a conventional jewel box; the container comprises a rectangular shell and a cartridge non-removably held within the shell, the cartridge in turn holding a disc; the disc is ejectable from one side with an ejection button; the cartridge is sheathed in the shell so as to have only one open side; the container allows printed material to completely obscure a disc held within the cartridge; yet the container allows one to determine visually whether a disc is stored within the cartridge from the position of the ejection button. The roof of the cartridge is provided with a detent in which the central aperture of the disc is held, and while so held, the disc is supported in the cartridge only at its opposed peripheral edges.

7 Claims, 7 Drawing Sheets

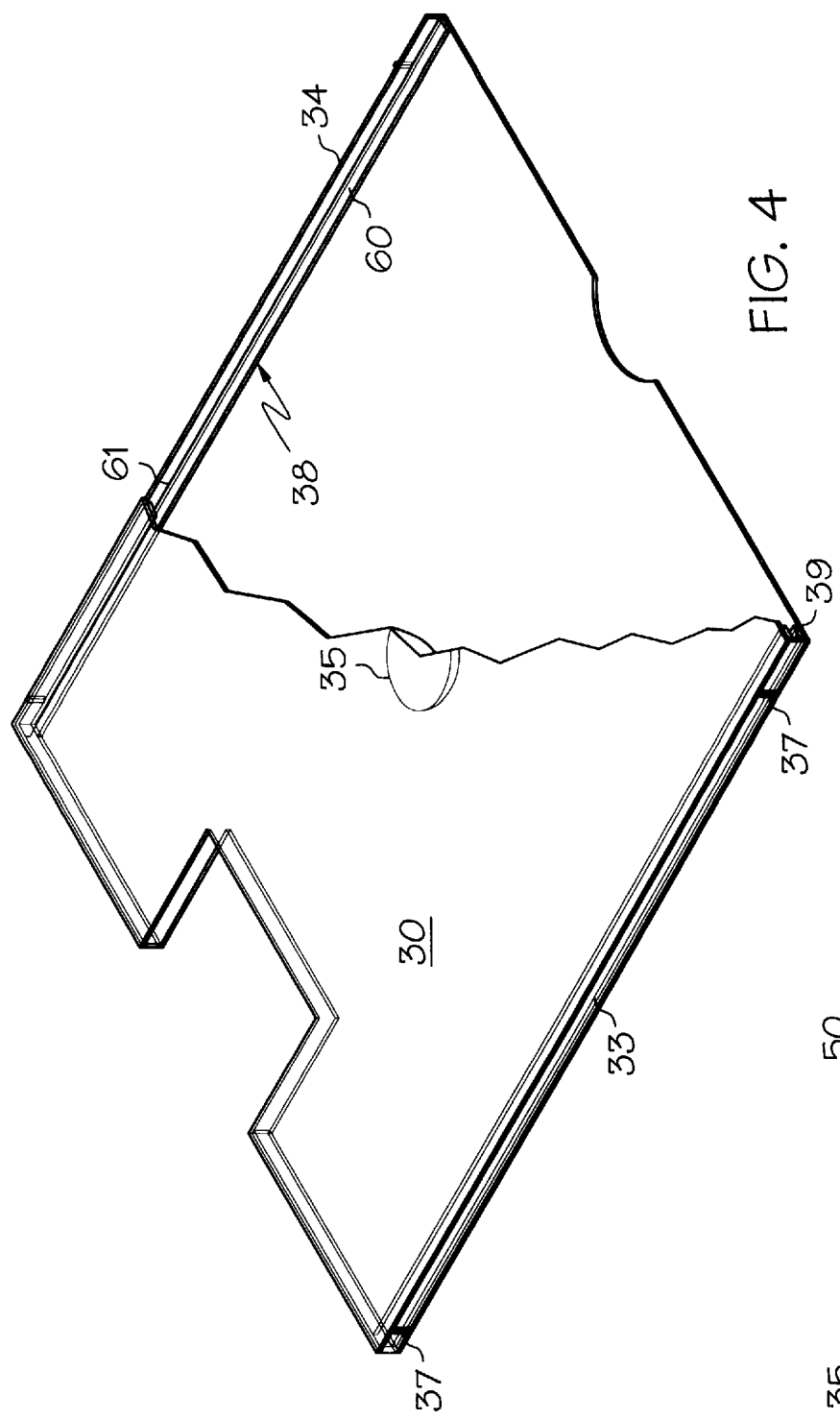
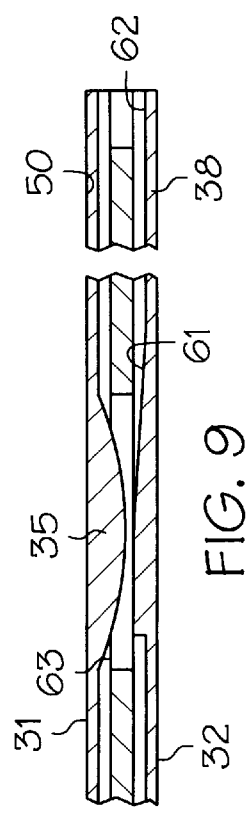
FIG. 4
FIG. 9

DOUBLE-WALLED CONTAINER FOR COMPACT DISC

BACKGROUND OF THE INVENTION

This invention relates to an improved storage container for a thin flexible laminar disc having a central aperture, such disc being used to store data electronically on one surface thereof. The disc, generally referred to as a compact disc or CD-ROM, is typically stored in a container referred to in the art as a "jewel box" (or "jewel case"). A currently popular ubiquitously marketed jewel box is hand-held to open it, and to remove a disc stored therein by lifting it in a direction normal (typically vertically) from its horizontal position within a storage insert or "tray" securely held in the lower wall or "floor" of the box. The box is opened by rotating the upper wall or "cover" of the box from its horizontal position. The cover is pivotable on a pair of opposed pivot pins which are journalled in a sidewall of the box, specifically the left sidewall, as the cover is designed to be opened with one's left hand. The box is closed by returning the cover to its horizontal position. The cover is provided with two pairs of oppositely disposed projecting ears spaced apart from its inside surface sufficiently to allow a booklet of lyrics or "libretto" to be slidably inserted along the inside surface of the cover, so that it is held by the ears. Currently marketed jewel boxes are made of a substantially transparent synthetic resinous material ("plastic"), typically polystyrene, so that the printed matter on the booklet may be read.

The problem is that the construction of a conventional jewel box is such that with the libretto held in the cover, a person cannot know whether the disc is in its tray, so that, to find out, it is necessary to open the box to check. Removing the disc from its tray subjects the disc to an unpredictable amount of flexural force, depending upon the size and strength of the hand removing it, and whether it is being removed in a hurry. Re-inserting the disc requires centering it in the tray; a substantial misalignment results in the lower recorded surface of the disc being abraded against the tray. The close tolerance required between the surface of a libretto and the spacing of the plastic ears from the inside surface of the cover, not only subjects the ears to breakage but also makes it difficult to re-insert the libretto, particularly if the libretto is handled many times and becomes somewhat dog-eared. Further, repeatedly opening and closing the cover results in the plastic pivot pins being broken off. The foregoing disadvantages of a jewel box are accepted because of its overwhelming economic advantage—it requires a minimum quantity of plastic and is easy to manufacture so that it is inexpensive.

Recognizing the foregoing problems, several attempts have been made to provide a container in which the disc is inserted and removed from one side, and to avoid using a pivotable cover. Such containers are disclosed in U.S. Pat. Nos. 5,676,246; 5,799,783; 5,944,180 and others. None suggests using a container with a double-walled construction.

SUMMARY OF THE INVENTION

It is a general object of this invention to provide a container with double-walled construction which eliminates problems encountered with a conventional jewel box; the container comprises a rectangular shell and a cartridge non-removably held within the shell, the cartridge in turn holding a disc; the disc is ejectable from one side with an ejection button; the cartridge is sheathed in the shell so as to have only one open side; the container allows printed material to completely obscure a disc held within the cartridge; yet the container allows one to determine visually whether a disc is stored within the cartridge from the position of the ejection button.

It is a specific object of this invention to provide a container comprising a rectangular paralleled piped shell within which is secured, preferably non-removably, a cartridge of generally similar rectangular shape, the cartridge having one open side, opposed guide rails, each with an inclined ramp over a portion of its length along each opposed sidewall of the cartridge, and an arcuate projection or "rounded detent" disposed between the rails, the detent projecting downward from the cartridge's upper wall or "cartridge roof"; the detent, preferably rounded, is dimensioned so as to be insertable within the central aperture of the disc when the aperture is urged into position by the flexure of the disc in contact with the ramps' upper surfaces; the inclination of the ramps, which are in mirror-image relationship with each other, is adapted to engage the rounded detent in the central aperture of the disc, and such inclination need extend along less than about one-half of the length (along the x-axis) of the cartridge, provided the ramps have a sufficient angle of inclination to force the central portion of the disc against the rounded detent until it is inserted in the central aperture. When an ejection button in one side of the shell is pressed inwards, it pushes against the disc stored in the cartridge and ejects the disc from the open side of the cartridge. The cartridge is secured within the shell with a predetermined spacing between the cartridge's floor and roof and the corresponding floor and roof of the shell, so as to allow printed matter to be inserted in the spaces therebetween.

It is also a specific object of this invention to provide a shaped laminar imprinted insert for the shell of the container.

It is another specific object of this invention to provide a simple and effective means for locking an article within another, wherein each article has resilient, parallel opposed sides.

Specific advantages of the double-walled container are that it provides:

(a) visual indication of the absence of a disc without having to handle the container;

(b) space between the respective roofs and floors of the cartridge and shell tailored to accept the amount of printed material to be included with the container;

(c) display of printed material on the roof, floor and three sides of the shell, which is more than can be conveniently displayed on a conventional jewel box;

(d) each of the foregoing without fragile pivot pins or hinges, using minimal space so as to be economical despite the additional synthetic resinous material required for the cartridge used to provide its double-walled construction.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 4 is a perspective view of the cartridge lying in the horizontal (x-y) plane with portions broken away, showing the one open side (right hand side) of the shell, through which open side a disc is inserted.

FIG. 9 is an enlarged detail view schematically illustrating the geometry of one of the guide rails to show the coaction of its inclined ramp and the rounded detent.

DETAILED DESCRIPTION OF PREFERRED EMBODIMENTS

The container may be adapted for storage of any compact audio or video discs which has a central aperture. The description herebelow is specifically directed to a commercial CD-ROM about 12 cm in diameter and less than 1 mm thick with a central aperture having a diameter of about 16 mm.

Figure 1:
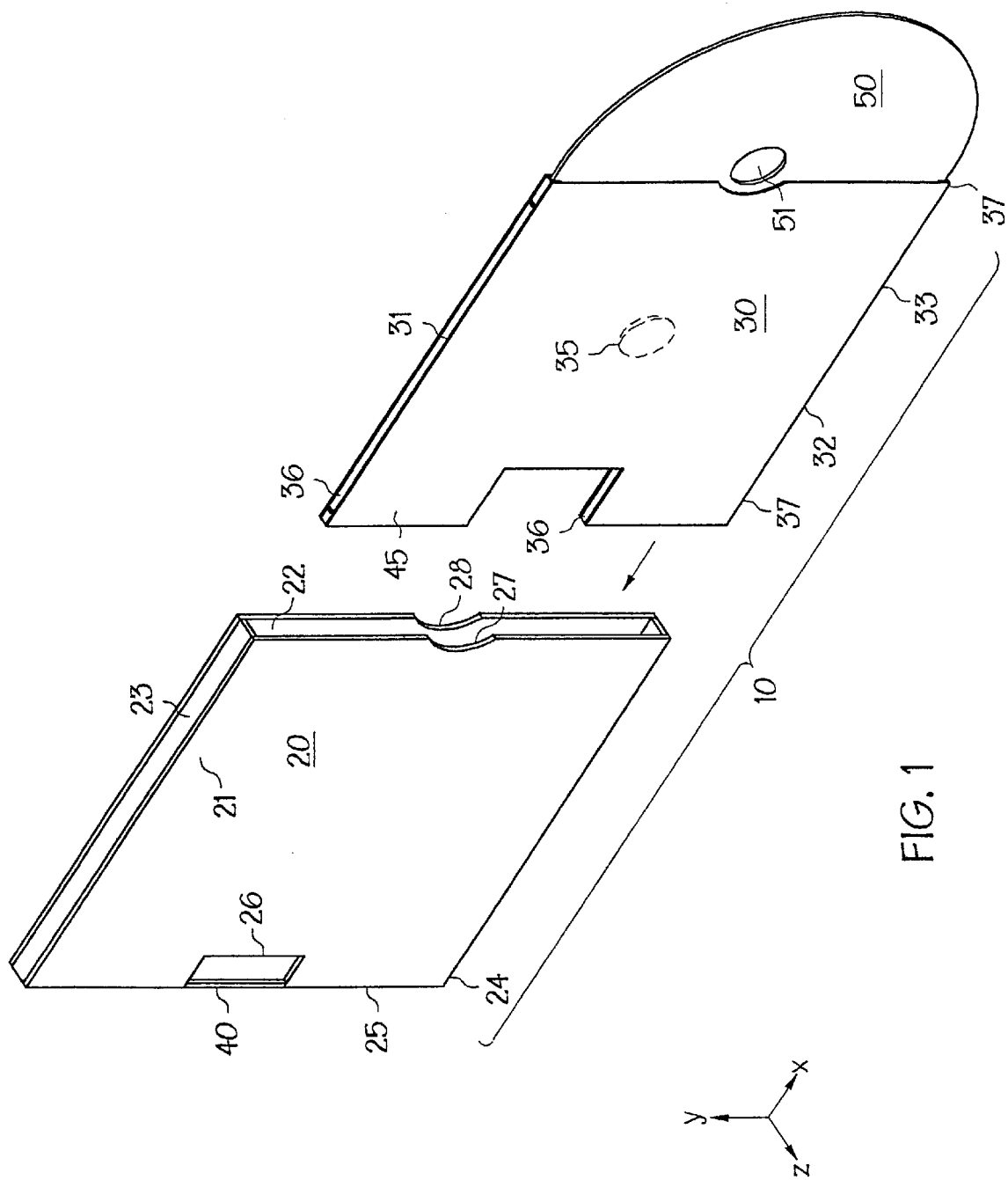
FIG. 1 is an exploded perspective view of a container showing an outer shell, a cartridge fitted therein and an ejection mechanism in one side of the shell.

Referring to FIG. 1, there is schematically illustrated a container referred to generally by reference numeral 10, comprising a shell 20 and a cartridge 30 dimensioned to be insertable within the shell in the direction of the arrow. The function of the cartridge is to store the disc and hold it securely in a central position within the cartridge; the shell protects the disc and cartridge within which the disc is held. The cartridge is preferably made from a synthetic resinous material of lesser cross-section than the shell, so that the cartridge uses far less material and is more flexible. The shell 20, shown lying flat in a horizontal x-y plane, is a rectangular paralleled piped having an upper wall or roof ("shell roof") 21 and a lower wall or ("shell floor") 22 spaced apart by opposed sidewalls 23, 24 and an end-wall 25 which is interrupted at its center to provide a recessed rectangular slideway indicated generally by 26, for an ejection button 40. The roof 21 and floor 22 are provided with cut-outs 27, 28 for finger access to the edge of a disc which is ejected.

Cartridge 30 is a smaller rectangular paralleled piped than the shell 20, the thickness (in the z direction) of which cartridge is such as to provide a predetermined rectangular space above and beneath its floor and roof respectively, when the cartridge is confined within the shell. The interior dimensions of the cartridge are essentially fixed by the structural requirements which effectively capture the central aperture 51 of disc 50 by a central "rounded" detent 35, on the underside of the cartridge roof 31. The cartridge floor 32 is spaced apart from the cartridge roof 31 by opposed sidewalls 33, 34 and end-wall 35. The end-wall 35 is interrupted to provide a rectangular recess 36 for access by the ejection button 40.

Figure 2:
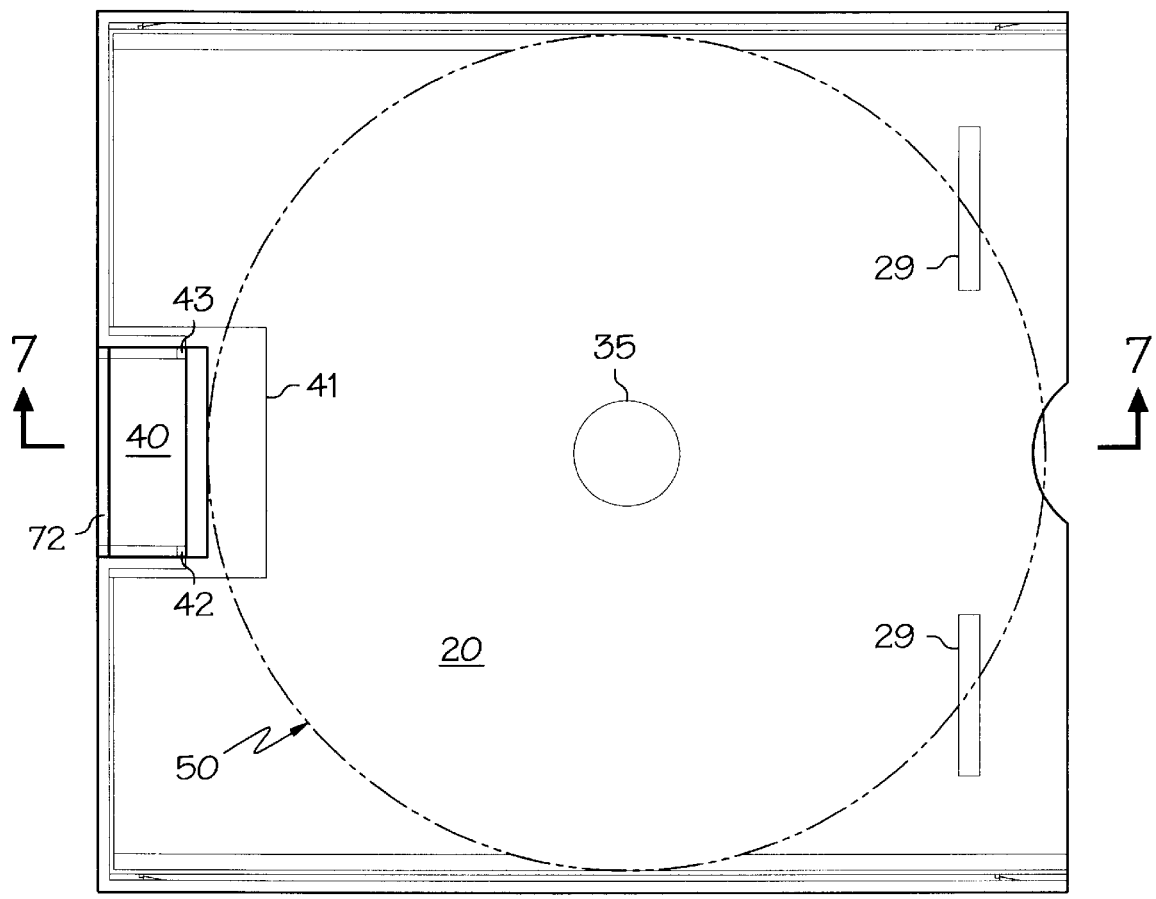
FIG. 2 is a top plan view of the assembled container showing in phantom outline, a disc stored therein.

The top plan view of the assembled container shown in FIG. 2 shows the cartridge 30 held within the shell 20 and disc 50 in phantom outline after the disc has been slidably inserted against end 41 of the ejector button 40. This causes the disc to be secured by the detent 35 in the roof 31 of cartridge 30. Guide-splines 42 and 43 in opposed faces of the slideway 26 allow ejection button 40 with a flange 72 to be reciprocably translated in the x-direction. The thickness (z-direction) of the ejection button is such that, to eject a disc, it is thrust between the roof 21 and floor 22 of the shell 20 until upper and lower portions of a flange 72 abut the roof 21 and floor 22 of the shell, thus ejecting the disc. The position of the ejection button 40 with its flange 72 against the inner edge 16 of slideway 26 shell, leaves a rectangular recess (which is the slideway 26 )in the end-wall 25 of the shell, visually indicating that the disc has been ejected. The under surface of the roof 21 of the shell 20 is preferably provided with retainer means such as bars 29 to retain a libretto inserted between the roofs 31 and 21 of the cartridge and shell respectively.

Figure 3:
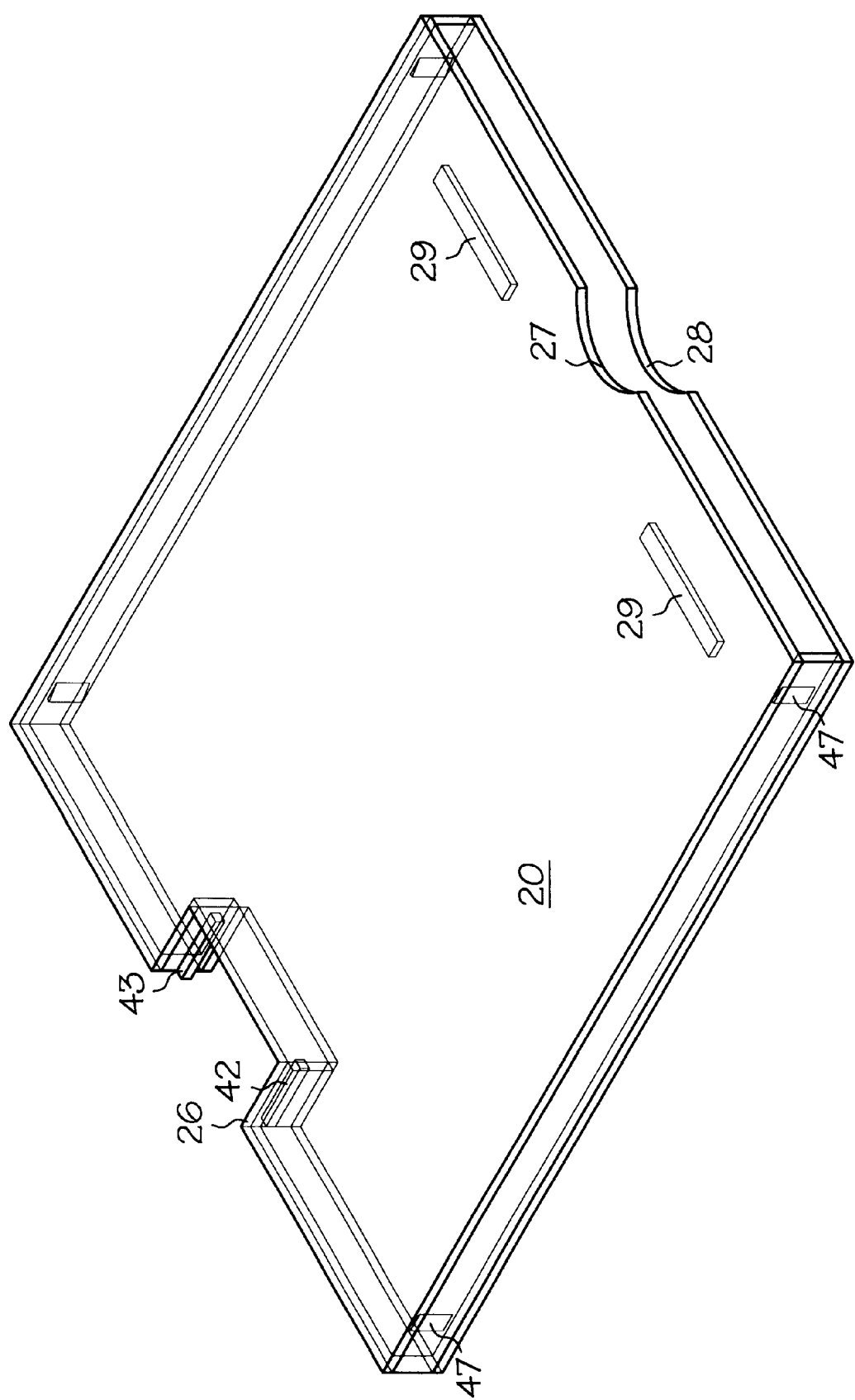
FIG. 3 is a perspective view of the shell lying in the horizontal (x-y) plane showing the one open side (right hand side) of the shell, through which open side a cartridge is inserted.

In the perspective view of the shell 20 illustrated in FIG. 3 there is shown in greater detail, the slideway 26 which is provided with opposed guide-splines 42, 43 which capture the ejection button 40 in the shell. In the sidewalls 23 and 24 are provided locking means to non-removably lock cartridge 30 within shell 20. The type of locking means is not narrowly critical and may be any locking means known in the art which will effectively fasten cartridge 30 in shell 20 so as to leave an annular zone around the cartridge. A convenient locking means is provided by locking ramps 46, 47 in the sidewalls of the shell, in which locking ramps are matingly received self-locking locking bars 37 on the outer surfaces of sidewalls 33, 34 of the cartridge 30; alternatively, wedge-shaped projections may be provided on adjacent faces of the shell and cartridge, the projections on one being angulated in a direction opposite from the other; still another alternative is to provide a recess in the shell wall and a mating locking bar on the cartridge which locking bar would be matingly held in the recess.

Referring to FIG. 4, the perspective view of cartridge 30, with portions broken away, shows one of two guide rails 38, 39 (only the end near the opening is shown) each with an inclined ramp 61. The width of each guide rail (y direction) is about as wide as the unused space (not used to store data) near the circumference of the disc and is preferably in the range from about 2 to 3 mm wide to avoid contact with data stored on the disc. The guide rail 38 in the near half of the cartridge has an essentially horizontal upper surface 62 lying in the x-y plane; further along the guide rail, as it approaches the central area between the walls 33, 34 of the cartridge, the upper surface of the guide rail rises upward at 61, as more clearly seen in the detail illustration of FIG. 9 in which the dimensions are exaggerated for clarity. At a location aligned with the central y-axis of the rounded detent, it is critical that the thickness of the inclined ramp (z direction) be such as to allow the bottom of the rounded detent to deflect a disc pushed up the ramp downwards. Thereafter the upper surface at 63 of the guide rail 38 is horizontal for a distance sufficient to provide support of the disc at a diametrically opposed location through the rounded detent. The horizontal portion 63 presents a surface in the x-y plane, vertically spaced apart from the horizontal surface 62 of the guide rail so that substantially no portion of the data-storage lower surface of the disc is in contact with the supporting guide rails. The disc 50 is supported at its opposed peripheral edges on the tops of surfaces 63 only, upper and lower surfaces are both spaced apart from the cartridge roof 31 and the cartridge floor 32 respectively, and the disc's lower surface is spaced apart from the remaining portion of the guide rail 38.

Figure 7:
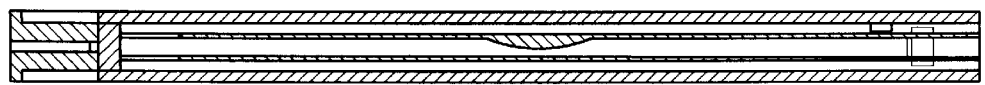
FIG. 7 is a cross-sectional view taken along the line 7—7 in FIG. 2, with a disc engaged by a central detent, enlarged and not to scale, to show the structural relationship of the rails and inclined ramps in the cartridge, and ejection button in the shell.

Referring to FIG. 7 there is schematically illustrated the position of the disc 50 in its "home" position with the disc's periphery in contact or near-contact with the thrusting end of the ejection button 40, the disc being supported only near its center, and neither the upper or lower surface of the disc being in contact with any other surface. Thus, when the inserted disc is held in place, the only contact between the disc and the cartridge are (i) the periphery of the detent, and (ii) the centrally aligned opposed surfaces 63, 64 under diametrically opposite edges of the disc. A libretto or album cover (not shown) is typically inserted in the space between the lower surface of shell roof 21 and the upper surface of cartridge roof 31.

It will now be seen that as disc 50 is urged upward along the ramped surface 61, the disc's upper surface is biased against the rounded detent 35 and is deformed thereby until the central aperture 51 of the disc is presented under the detent 35, whereupon the disc is securely held though the disc is only supported on the surface 63 and the corresponding surface 64 (not shown) of guide rail 39.

Figure 5:
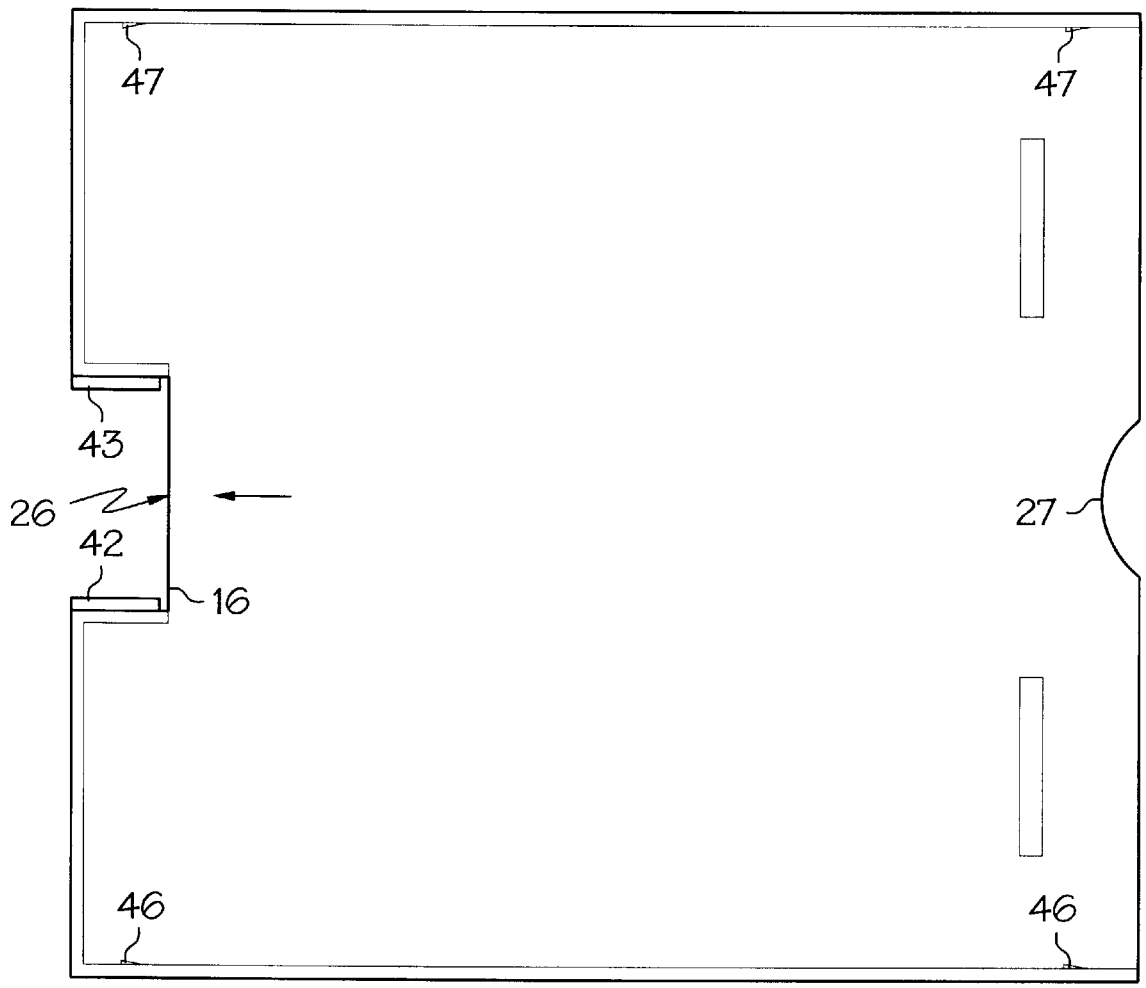
FIG. 5 is a top plan view of the shell only, showing a recessed slideway for the ejection button.

FIG. 5 is a top plan view of the shell showing guide-splines 42, 43 in the recessed slideway 26, and four self-locking locking ramps 46, 47, two locking ramps 46 on the inner surface of shell sidewall 24, and two locking ramps 47 on the inner surface of the opposite shell sidewall 23; locking ramps 46 are oppositely located near the opposed ends of sidewall 24, and locking ramps 47 are oppositely located near the opposed ends of sidewall 23. The function of the locking ramps 46, 47 is to matingly lock self-locking detents such as locking bars 37 on cartridge 30 when the cartridge is inserted in the direction of the arrow, behind the locking ramps 47; the cartridge is then non-removably secured in the shell 20 and closely sheathed therewithin. The shape of a locking bar is not narrowly critical; vertical bars integrally formed on the outer surfaces of sidewalls 33, 34 provide adequate purchase behind locking ramps 47.

Figure 8:
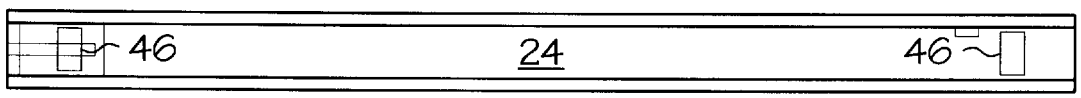
FIG. 8 is a side elevational view of the shell shown in FIG. 5.

The side elevational view shown in FIG. 8 locates internal locking ramps 46 near the opposed ends of sidewalls 24 of the shell so as to permit display of the maximum area of printed matter behind each sidewall.

Figure 10:
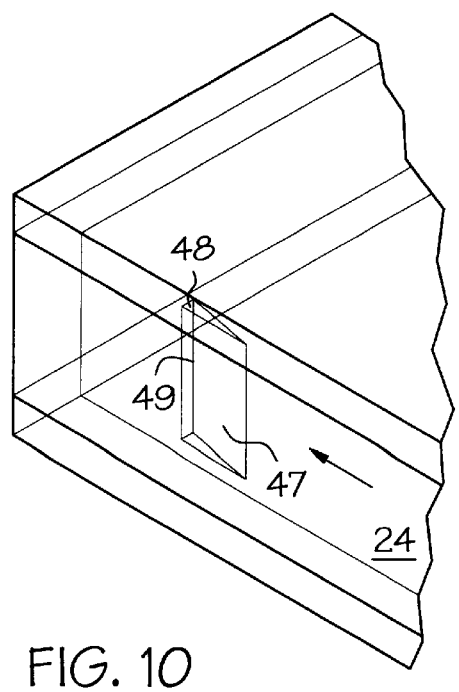
FIG. 10 is a perspective view, with a portion broken away, of one sidewall of the shell; on the inner surface of each sidewall locking ramps are provided which are adapted to receive self-locking detents matingly inserted therein.

Referring to FIG. 10, there is illustrated shell sidewall 24 with one of two spaced-apart locking ramps 47 shown as an immovable substantially wedge-shaped projection, one locking ramp near each respective end of the sidewall 24. The ramp 47 is integrally formed in the sidewall 24; hypotenuse 48 of the wedge-shaped projection is inclined inwardly (towards the longitudinal central axis of the shell) from the interior surface of the sidewall 24, in a direction in which the cartridge is to be inserted, at an acute angle sufficient to provide a locking function without obstructing insertion of the cartridge. An acute angle in the range from about 1° to 45° allows the opposite side of the wedge-shaped projection, that is opposite the acute angle, to provide a locking surface 49. The hypotenuse 48 extends for a sufficient distance to allow a locking bar 37 to be locked against the locking surface 49 after a cartridge is inserted into the shell 20 in the direction of the arrow, when the locking bars 37 are urged over the inclined surface 48. Locking ramps 46 are in mirror-image relationship to locking ramps 47. It will now be evident that there must be sufficient relative movement between the shell sidewall 24 and the cartridge sidewall 33 to allow the cartridge to be thrust far enough so that the locking bars go past the inclined surfaces of the wedge-shaped projections. To provide such relative movement the shell and cartridge are constructed from plastic sufficiently resilient to do so. In a typical container for a CD-ROM sufficient resilience is provided by a relative movement, in a direction normal to the sidewalls, in the range from about 0.0254 mm (0.001") to about 0.508 mm (0.020").

An alternative means for locking the cartridge in the shell is to a known locking means which provides locking recesses in the sidewalls 23, 24 and wedge-shaped projections on the cartridge sidewalls 33, 34 with the inclined surface flaring away from the central longitudinal axis, so that once the hypotenuse of a wedge travelled past the edge of a recess, it would be captured in the recess. Still another alternative means for non-removably securing the cartridge in the shell is to adhesively secure opposed inner and outer surfaces of the shell and cartridge respectively, or to provide a sonic weld therebetween.

Figure 6:
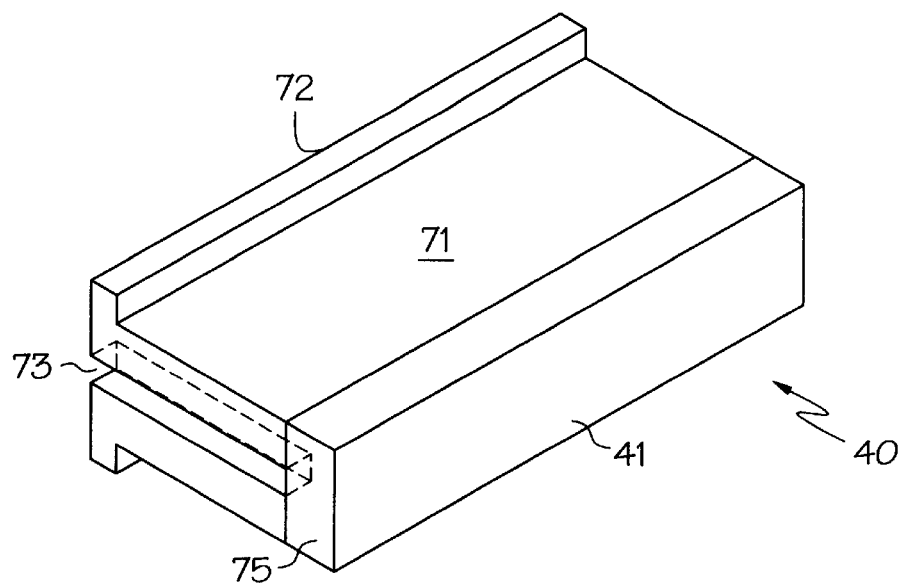
FIG. 6 is a perspective view of the ejection button lying in the horizontal (x-y) plane.

FIG. 6 is a perspective view of the ejection button 40 which is preferably a rectangular body 71 having a thickness (z direction) slightly less than the space between the opposed inner surfaces of the shell's floor 22 and roof 21 respectively, and a flange 72 which extends vertically a short distance above and below the upper and lower surfaces of the body 71, so as to abut the roof 21 and floor 22 respectively, of the shell 20. A groove 73, one in each opposed wall of the body 71, extends laterally (x direction) about mid-way in the body 71, and through the side edges of flange 72 so as to enable the ejection button to be slidably reciprocated on the grooves 73 in which guide splines 42, 43 are slidably inserted. Each groove 73 terminates just before the far end of the body 71 which end is distally disposed relative to the flange 72. The length (x direction) of the body 71 is such that, when the ejection button is in its "home" location, that is when the disc 50 is held in rounded detent 35 and the outer surface of flange 72 is flush with the outer surface of endwall 25 of the shell, the distal end 41 of the body 71 is in contact with the periphery of the disc 50.

To locate the ejection button 40 in its "home" position, and to prevent the button to fall out, grooves 73 terminate a short distance from end 41 so that the termination of the each groove 73 provides a bumper stop 75 which abuts the end of each guide-spline 42, 43 and stops the face of flange 72 from moving beyond the vertical plane of the outer surface of endwall 25. The height (z direction) of flange 72 preferably corresponds to the overall height of the shell 20. It will now be evident that the length of the guide-splines 42, 43 and grooves 73 is such as to allow the ejection button 40 sufficient travel to push the central aperture 51 of disc 50 past the rounded detent 35 and to a location between the finger cut-outs 27, 28.

The guide-splines 42, 43 are fitted in the grooves 73 of ejection button 40 preferably before securing the shell roof 21 to the sidewalls 23, 24 and endwall 25. Grooves 73 extend through the sides of the flange 72. The ejection button 40 is inserted by thrusting the flange 72 over the inner edge 16 of the slideway recess 26 and pressing downwards until the guide-splines are inserted in the grooves 73 on either side of the flange, and continuing to push the ejection button 40 in the direction of the arrow in FIG. 5, until the end 41 of the button clears the inner edge 16 of the recess 26.

Figure 11:
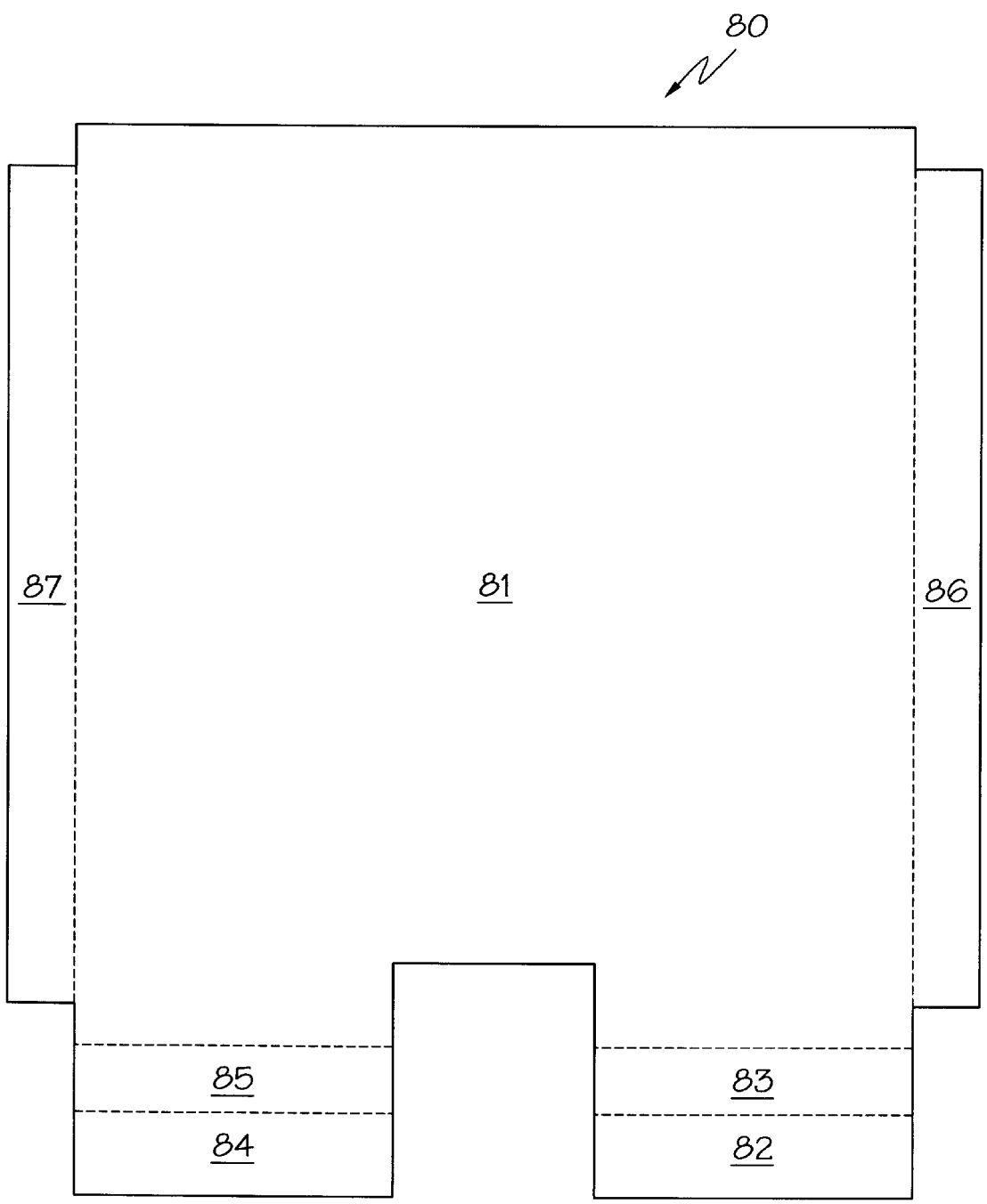
FIG. 11 is a plan view of a printed document insert, typically relating to data carried on a compact disc, which document is to be folded along the fold lines shown when it is inserted in the shell.

Referring to FIG. 11 there is shown a laminar sheet of paper 80 or other imprintable material on which the dotted lines adjacent solid lines indicate fold lines when the sheet 80 is to include the last page of an album cover which is to be printed, so that each rectangular portion 81, 82, 83, 84, 85, 86, 87 presents information about the contents of the album or its performers, drawings, photographs and the like, a corner of one portion typically being devoted to a bar code. The dimensions of portion 81 correspond substantially to the inner area of the shell floor 22 so that when folded along its margins, indicated by the dotted lines for portions 86 and 87, each portion fits behind each of the sidewalls 24, 23 respectively; when folded along its margins indicated by dotted lines for portions 83, 85, and folded again along margins indicated by dotted lines between portions 82, 83 and 84, 85, portions 83 and 85 fits behind endwall 25, on either side of ejector button 40; and portions 82 and 84 are secured between the roofs of the cartridge and shell when the sheet 80, folded as indicated and having the cartridge inserted therein, is inserted in the shell. The visible outer surfaces of each of the above-identified portions is available for printing.

Having thus provided a general discussion, described the double-walled container in detail and illustrated the invention with specific examples of the best mode of making and using it, it will be evident that the invention has provided an effective solution to a difficult and old problem. It is therefore to be understood that no undue restrictions are to be imposed by reason of the specific embodiments illustrated and discussed, and particularly that the invention is not restricted to a slavish adherence to the details set forth herein.

We claim:

1. A container for a laminar disc, said container comprising, a double-walled container including a rectangular shell and a cartridge adapted to position said disc within said cartridge in said shell; said shell having one open end oppositely disposed relative to an end-wall having a recessed slideway, and a shell roof and floor spaced apart by opposed shell-sidewalls; and, an ejection button non-removably disposed for reciprocation within said recessed slideway, said ejection button being positioned to abut said disc's periphery;

said cartridge having one open end oppositely disposed relative to a cartridge end-wall having a recess, and a cartridge roof and floor spaced apart by opposed cartridge-sidewalls, said cartridge's open end being substantially coextensive with said shell's open end; said cartridge having opposed guide rails in mirror-image relationship with each other, each with an inclined ramp over a portion of its length along said opposed cartridge-sidewalls;

a rounded detent disposed intermediate the rails, said detent projecting downward from said cartridge roof, said detent being dimensioned to be insertable within said disc's central aperture, said ramps having an upward inclination adapted to urge said central aperture into engagement with said rounded detent; said cartridge's recess being adapted to present said disc's periphery for abutment against said ejection button protruding into said cartridge, whereby said disc is ejectable through said open ends when said ejection button is thrust against said disc.

2. The container of claim 1 wherein said cartridge is non-removably inserted within said shell.

3. The container of claim 1 wherein space between the outer surfaces of said cartridge and the inner surfaces of said shell is adapted to store a document.

4. The container of claim 1 wherein said guide rails and ramps cooperatively define an inclined surface along which said disc is inserted until said cetral aperture is engaged in said detent whereby said disc is supported only at its opposed peripheral edges on said guide rails while held in said detent.

5. In a container for a laminar disc, said container comprising a rectangular parallelepiped shell and a cartridge closely sheathed therein, each having only one open end coextensive with one another, and opposed surfaces of sidewalls laterally translatable relative to each other, and coextensive floors and roofs, the improvement comprising, said cartridge having opposed guide rails in mirror-image relationship with each other, each with an inclined ramp over a portion of its length along said opposed cartridge-sidewalls, a detent disposed intermediate the guide rails, said detent projecting downward from said cartridge roof, said detent being dimensioned to be insertable within said disc's central aperture, said ramps having an upward inclination adapted to urge said central aperture into engagement with said detent, said cartridge's recess being adapted to present said disc's periphery for abutment against an ejection button protruding into said cartridge, whereby said disc is ejectable through said open ends when said ejection button is thrust against said disc.

6. The container of claim 5 having a locking mechanism for locking said cartridge within said shell, said locking mechanism including, a pair of integrally formed, immovable wedge-shaped projections, one on the inside surface of each opposed sidewall of said shell, a hypotenuse of each projection flaring inwardly from each said sidewall;

a pair of fixed locking bars, one each on opposed outside surfaces of each sidewall of said cartridge, said locking bars located to correspond in position to said wedge-shaped projections so as to engage said wedge-shaped projections when said locking bars are urged over said wedge-shaped projections;

each side of each said wedge-shaped projection extending normally to each said outside surface for a distance sufficient to engage said locking bar when said cartridge is pulled in a direction opposite to that required to insert it in said shell.

7. The container of claim 5 wherein said cartridge and shell are formed from a substantially transparent synthetic resinous material and walls of said shell and said cartridge have resilience to allow relative movement therebetween sufficient to urge said locking bars over said wedge-shaped projections.

* * * * *